United States Patent [19]
Vazquez et al.

[11] Patent Number: 5,930,939
[45] Date of Patent: Aug. 3, 1999

[54] TAPERED FISHING ROD

[76] Inventors: William M. Vazquez, 1648 Jupiter Cove Dr., Jupiter, Fla. 33469; Donald Toth, 1001 Seafarer Cir. #304, Jupiter, Fla. 33477

[21] Appl. No.: 09/224,521

[22] Filed: Dec. 31, 1998

Related U.S. Application Data

[63] Continuation-in-part of application No. 08/976,765, Nov. 24, 1997.

[51] Int. Cl.⁶ .................................................. A01K 87/00
[52] U.S. Cl. ............................................................. 43/18.1
[58] Field of Search ................................. 43/24, 18.1, 19

[56] References Cited

U.S. PATENT DOCUMENTS

| | | | |
|---|---|---|---|
| 3,432,958 | 3/1969 | Bellinger | 43/18.1 |
| 4,183,163 | 1/1980 | Reimer | 43/24 |
| 4,541,197 | 9/1985 | LeRoue | 43/18.1 |
| 5,241,773 | 9/1993 | Burgh | 43/18.1 |
| 5,381,619 | 1/1995 | Watkins | 43/18.1 |
| 5,575,103 | 11/1996 | Hare | 43/18.1 |

*Primary Examiner*—Robert P. Swiatek
*Assistant Examiner*—Son T. Nguyen
*Attorney, Agent, or Firm*—Quarles & Brady LLP

[57] ABSTRACT

A fishing apparatus includes a reel, a reel butt, an elongated member, and a hook guard. The reel butt has a reel seat for holding the reel. The elongated member has an open distal end and is connected to the reel seat opposite the open distal end. Also, the elongated member defines a truncated conical chamber tapering outward from the reel butt to the open distal end. The elongated member also defines an opening in the elongated member adjacent the reel seat that communicates line between the reel and the chamber. The open distal end is dimensioned to prevent a weight from entering the chamber. The hook guard prevents hooks from hooking onto the elongated member.

5 Claims, 1 Drawing Sheet

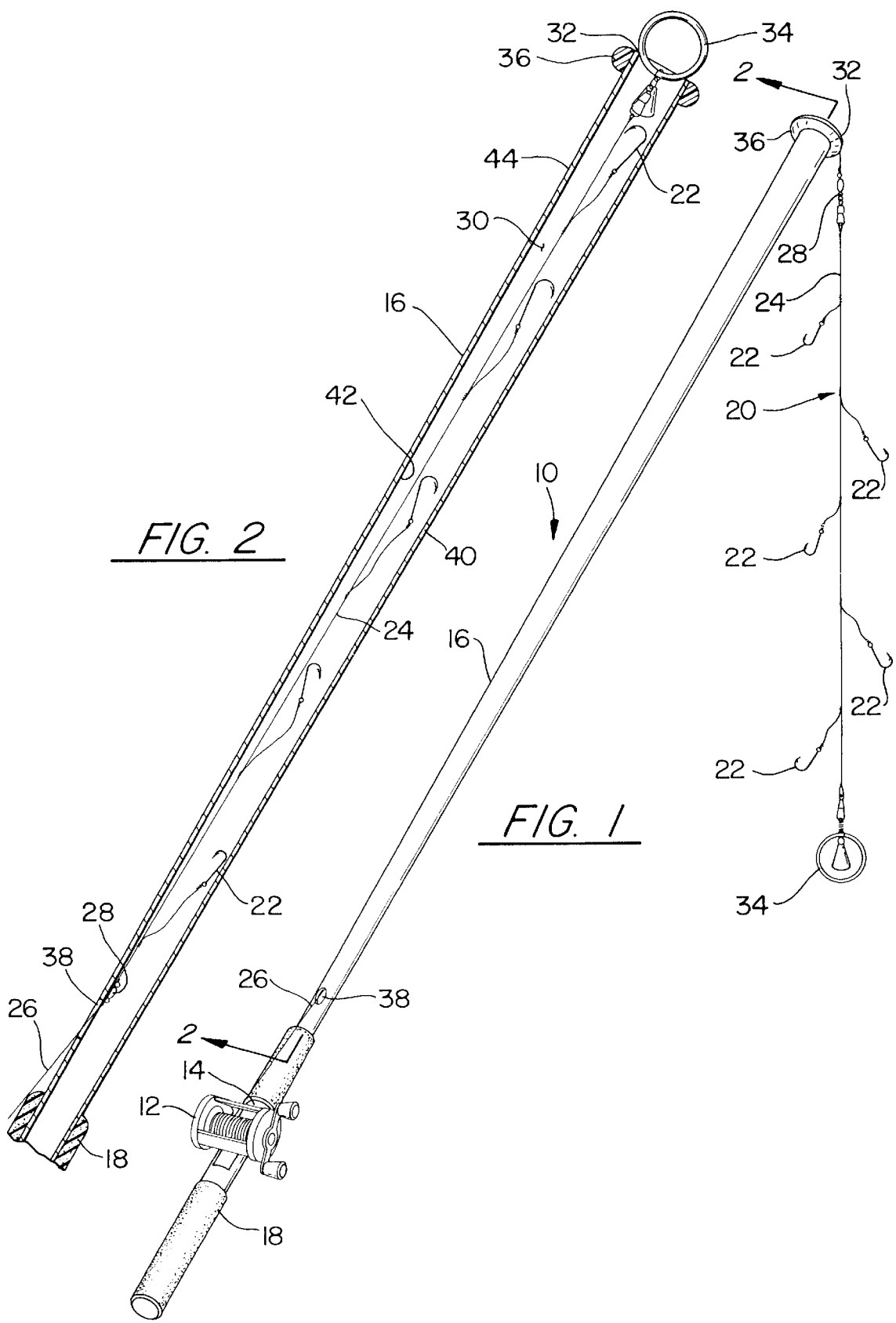

TAPERED FISHING ROD

CROSS-REFERENCE TO RELATED APPLICATION

This is a continuation-in-part of application Ser. No. 08/976,765, filed Nov. 24, 1997, still pending.

STATEMENT REGARDING FEDERALLY SPONSORED RESEARCH AND DEVELOPMENT

Not Applicable

FIELD OF THE INVENTION

This invention relates to fishing equipment. More specifically, the invention relates to a novel tubular fishing pole capable of casting and housing a rig with multiple hooks.

BACKGROUND OF THE INVENTION

Fishing with a rig having two or more hooks has long been considered a more efficient way to fish. When large numbers of fish need to be caught, for example, with commercial fishing or with bait fish, a greater number of hooks on a rig gives the person fishing more chances to catch more fish. As such, rigs with multiple hooks are popular with bait fishing and commercial fishing.

However, fishing with multiple hooks does present several problems. One such problem with a rig having multiple hooks is that the hooks tend to snag each other or tangle with the line of the rig. This phenomena is also known as fouling. Once fouling has occurred with a rig, the rig is likely incapable of being casted and is also less likely to be effective in catching fish. Once fouled, undesirable options are available to remedy the condition. These remedies include the time-consuming process of untangling the rig or replacing the fouled rig with a new rig. With the first remedy, time is wasted, and with the second remedy both time and a rig is wasted. Because efficiency of fishing is a major benefit of the multiple hook rig, fouling inherent with the multiple hook rig decreases the benefit of that efficiency.

Another problem associated with the multiple hook rig is safety. Safety is of particular concern when children are using a multiple hook rig to catch bait fish. More hooks on a rig increases the likelihood of a hook snagging on clothing or even puncturing the skin. This can occur when the rod is being stored, being transported, being cast, or being reeled in. In addition to being a safety problem, removing a hook from the object in which the hook was embedded is a time-consuming process that also decreases the efficiency of the multiple hook rig.

Several types of fishing rods have been developed to handle multiple hook rigs. One example is disclosed in U.S. Pat. No. 5,241,773 to Burgh. Burgh discloses a hollow shaft that inwardly tapers from the reel to the distal end of the shaft. At the distal end of a shaft is an open-mouth flute for receiving a weight. The rod of Burgh acts to prevent some fouling of the hooks and to cover the hooks when reeled into the shaft. However, because the shaft is at its narrowest at the distal end of the shaft, the narrow opening limits the size of a hook that can be placed within the shaft. Also, the narrowing of the shaft as it approaches the distal end tends to restrict the outward progress of the rig from the shaft which can lead to fouling.

Rods similar to Burgh are also shown in U.S. Pat. No. 5,575,103 to Hare, U.S. Pat. No. 5,381,619 to Watkins, and U.S. Pat. No. 5,806,231 to Okada et al. Hare, Watkins and Okada also disclose hollow shafts that prevent some fouling of hooks and can cover the hooks when reeled into the shaft. However, Hare, Watkins and Okada disclose shafts that taper inwardly from reels to the distal ends of the shafts. The narrow opening at the distal end of the shaft restricts the size of a hook that can be reeled into the shaft and restricts the movement of hooks out of the shaft.

BRIEF SUMMARY OF THE INVENTION

It is an object of the invention to provide a fishing apparatus that reduces fouling associated with the use of multiple hook rigs.

It is another object of the invention to provide a fishing apparatus that can use multiple hook rigs and be safely stored, transported, handled, cast or reeled in.

It is a still another object of the invention to provide a fishing apparatus that can safely be used with children.

These and other objects of the invention are achieved by a fishing apparatus which comprises a reel, a reel butt, an elongated member, and a hook guard. The reel butt has a reel seat for holding the reel. The elongated member has an open distal end and is connected to the reel seat opposite the open distal end. The elongated member defines an internal truncated conical chamber tapering outward from the reel butt to the open distal end. The diameter of the chamber expands from the reel seat to the open distal end which prevents the fouling of a rig being cast from the elongated member.

The elongated member can also define an opening adjacent the reel seat that communicates line between the reel and the chamber. The open distal end can be dimensioned to prevent a weight from entering the chamber. This enables the rig to be safely stored within the chamber. A hook guard can also be included to prevent hooks from hooking onto the elongated member.

BRIEF DESCRIPTION OF THE DRAWINGS

There are shown in the drawings embodiments of the invention that are presently preferred, it being understood, however, that the invention is not limited to the precise arrangements and instrumentalities shown, wherein:

FIG. 1 is a perspective view of the fishing apparatus and rig according to the invention; and, FIG. 2 is a partial cross-section taken along the line 2—2 of FIG. 1.

DETAILED DESCRIPTION OF THE INVENTION

FIG. 1 illustrates a fishing apparatus according to an inventive arrangement. The fishing apparatus 10 comprises a reel 12, a reel seat 14, an elongated member 16, and a reel butt 18. The reel 12 holds fishing line 26 that can be connected to a fishing rig 20 via a swivel 28. Although the fishing apparatus 10 can be used with any type of fishing rig 20, the fishing apparatus 10 is particularly adapted for use with a multiple-hook fishing rig 20. A multiple-hook fishing rig 20 typically comprises separate hooks 22 spaced along the line 24 of the rig 20.

The invention is not limited as to the type of reel 12 that can be used with the fishing apparatus 10. Any type of reel 12 that can store, retrieve and let out fishing line 26 is acceptable. The presently preferred reel 12 is a closed faced spinning reel.

The invention is also not limited as to the type of reel butt 18 that is used to hold the reel 12. Any type of reel butt 18 that can hold the reel 12 and that can be connected to the elongated member 16 is acceptable. The presently preferred reel butt 18 includes a reel seat 14 for holding the reel 12.

FIG. 2 illustrates an elongated member 16 according to the invention. The elongated member 16 has a wall 40 with an inner surface 42 that defines a truncated conical chamber 30 that is internal to the elongated member 16 and also tapers outwardly from the reel butt 18 to an open distal end 32 of the elongated member 16 such that the diameter of the chamber 30 nearer the open distal end 32 is greater than the diameter of the chamber 30 nearer the reel butt 18. The elongated member 16 can include an opening 38 through which the fishing line 26 can pass from the reel 12 through the chamber 30 to an open distal end 32 of the elongated member 16. Although the opening 38 can be positioned anywhere along the elongated member 16, the presently preferred opening 38 is positioned adjacent the reel 12. Advantageously, this positioning maximizes the length of fishing line 26 within the chamber 30.

Although the inner surface 42 of the wall 40 of the elongated member 16 tapers outwardly, from the reel butt 18 to the open distal end 32, the outer surface 44 is not so limited. The outer surface 44 can be any shape, for example cylindrical, tapering outward, or tapering inward. However, because the presently preferred wall 42 has a constant thickness, the outer surface 44 of the wall approximates the shape of the inner surface 42 of the wall.

Although the open distal end 32 is not limited as to size, the presently preferred open distal end 32 is dimensioned to prevent a weight 34 positioned on the rig 20 from passing through the open distal end 32 into the chamber 30. Once the weight 34 is prevented from entering the chamber 30, the fishing line 24, along with the accompanying rig 20, can be reeled in with the reel 12 into the chamber 30 until the fishing line 24 and rig 20 are taut. Once so positioned, the rig 20 can be stored within the chamber 30. Advantageously, because the rig 20 is stored within an enclosed chamber 30, the risk of the hooks 22 snagging a foreign object is minimized. Thus, a person, especially a child, using the fishing apparatus 10 would less likely be exposed to the hooks 22. Also, because the rig 20 is stored taut, the hooks 22 will not have the opportunity to bunch up and snag each other. Thus, the rig 20 can safely be stored within the chamber 30 in a manner that prevents fouling of the rig 20.

A hook guard 36 can also be positioned adjacent the distal end 32. Any hook guard 36 that acts to prevent a hook 22 on the rig 20 from being caught on the elongated member 16 is acceptable. The presently preferred hook guard 36 is a donut-shaped ferrule.

The outward taper of the chamber 30 advantageously allows hooks 22 of several sizes to pass through the open distal end 32. Larger hooks 22 can be positioned on the rig 20 closer to the weight 34 and smaller hooks 22 can be positioned farther away from the weight 34. In contrast, an inwardly tapering chamber would limit the size of the hooks to that of the size of the distal end. Thus, to use the same size hooks 22, an elongated member with an inwardly tapering chamber would have to be larger than the elongated member 16 of the present invention.

Also, the outward taper of the chamber 30 tends to prevent fouling of the rig 20 and hooks 22. The locations of a chamber 30 in which fouling is most like to occur is at the open distal end 32 and at the most restricted diameter of the chamber 30. In an inwardly tapering chamber, the most restricted diameter is at the open distal end thereby further increasing the likelihood of fouling at the open distal end. However, with an outwardly-tapering chamber 30, the open distal end 32 is the least restricted diameter. This feature negates the fouling potential of the open distal end 32 by providing a large diameter at the open distal end 32.

This feature is particularly important when the fishing apparatus 10 is used to cast a rig 20. In comparison, an inwardly tapering chamber restricts the space a hook 22 must travel before exiting the chamber. This restricting of a hook 22 by the walls 40 of the elongated member 16 can slow down the hook and allow following hooks 22 to catch up with the first hook 22 and become entangled with each other. However, an outwardly tapering chamber 30 gives each hook 22 more space and less resistance as the hook 22 travels down the chamber 30. Thus, the risk of hooks 22 becoming fouled is decreased.

The outward taper of the chamber 30 also facilitates the reeling in of a rig 20. As the diameter of the open distal end 32 becomes larger, the risk of a hook 22 being snagged by the distal end 32 is lessened. For example, if at one extreme the open distal end 32 has a diameter the same size as a width of a hook 22, the hook 22 passes through the open distal end 32 with considerable friction. However, if at the other extreme the open distal end 32 has a diameter many times larger than the width of the hook 22, the hook 22 passes through the open distal end 32 with considerably less friction. Thus, with an outwardly tapering chamber 30, a rig 20 is subjected to less friction by the open distal end 32 when the rig 20 is reeled in.

What is claimed is:

1. A fishing apparatus, comprising:
   a reel butt adapted for holding a reel; and
   an elongated member connected to said reel butt and defining an internal truncated conical chamber tapering with continuously increasing diameter outwardly from a proximal end of said elongated member adjacent to said reel butt, said conical chamber having an open distal end opposing said real butt, said elongated member defining an opening for communicating a line from said reel into said chamber and out said open distal end.

2. A fishing apparatus according to claim 1, further comprising a hook guard for preventing hooks from snagging said elongated member, said hook guard attached to said elongated member adjacent said open distal end.

3. A fishing apparatus according to claim 1, wherein said opening is positioned substantially adjacent said reel butt.

4. A fishing apparatus according to claim 1, wherein said reel butt includes a reel seat adapted for holding said reel.

5. A fishing apparatus, comprising:
   a reel butt having a reel seat adapted for holding a reel;
   an elongated member connected to said reel butt and defining an internal truncated conical chamber tapering with continuously increasing diameter outwardly from a proximal end of said elongated member adjacent to said reel butt, said conical chamber having an open distal end opposing said real butt, said elongated member defining an opening for communicating a line from said reel into said chamber and out said open distal end, said opening substantially adjacent said reel seat; and,
   a hook guard attached to said elongated member adjacent said open distal end.

* * * * *

UNITED STATES PATENT AND TRADEMARK OFFICE
CERTIFICATE OF CORRECTION

PATENT NO.   :   5,930,939
DATED        :   August 3, 1999
INVENTOR(S)  :   William M. Vazquez and Donald Toth It is certified that error appears in the above-identified patent and that said Letters Patent is hereby corrected as shown below:

On the title page, item [76] Inventors:

The inventor name of "William M. Vazquez" should read

--William Vazquez--.

Signed and Sealed this

Twenty-third Day of November, 1999

Attest:

Q. TODD DICKINSON

*Attesting Officer*   *Acting Commissioner of Patents and Trademarks*